United States Patent
Hoffmann et al.

(10) Patent No.: US 7,293,415 B2
(45) Date of Patent: Nov. 13, 2007

(54) METHOD OF OPERATING A GAS TURBINE GROUP

(75) Inventors: Jürgen Hoffmann, Untersiggenthal (CH); Tom Alexander Odin McKay, Ennetbaden (CH); Nikolaus Herbert Kurz, Überlingen (DE); Tobias Spitzmüller, Ennetbaden (CH)

(73) Assignee: ALSTOM Technology Ltd, Baden (CH)

( * ) Notice: Subject to any disclaimer, the term of this patent is extended or adjusted under 35 U.S.C. 154(b) by 314 days.

(21) Appl. No.: 11/201,105

(22) Filed: Aug. 11, 2005

(65) Prior Publication Data

US 2006/0010876 A1   Jan. 19, 2006

Related U.S. Application Data

(63) Continuation of application No. PCT/EP2004/050086, filed on Feb. 5, 2004.

(30) Foreign Application Priority Data

Feb. 11, 2003   (CH) .............................. 2003 0207/03

(51) Int. Cl.
*F02C 3/30* (2006.01)
*F02C 9/00* (2006.01)

(52) U.S. Cl. .................. 60/775; 60/39.27; 60/39.3; 60/39.53

(58) Field of Classification Search .............. 60/39.53, 60/39.27, 39.3, 728, 773, 775, 794

See application file for complete search history.

(56) References Cited

U.S. PATENT DOCUMENTS

| | | | | |
|---|---|---|---|---|
| 5,353,585 A | | 10/1994 | Munk | 60/39.05 |
| 5,454,220 A | | 10/1995 | Althaus et al. | 60/39.04 |
| 5,566,542 A | * | 10/1996 | Chen et al. | 60/775 |
| 6,012,279 A | | 1/2000 | Hines | 60/39.05 |
| 6,216,443 B1 | | 4/2001 | Utamura | 60/39.53 |
| 6,357,236 B1 | | 3/2002 | Utamura | 60/728 |
| 6,718,771 B1 | * | 4/2004 | Kopko | 60/775 |
| 7,104,071 B2 | * | 9/2006 | Braun et al. | 60/775 |
| 2001/0039794 A1 | | 11/2001 | Rocklin et al. | 60/39.05 |
| 2002/0139105 A1 | | 10/2002 | Horii et al. | 60/39.3 |

FOREIGN PATENT DOCUMENTS

| EP | 0 620 362 | 10/1994 |
|---|---|---|
| FR | 1.563.749 | 4/1969 |

* cited by examiner

*Primary Examiner*—L. J. Casaregola
(74) *Attorney, Agent, or Firm*—Steptoe & Johnson LLP

(57) ABSTRACT

In a method for operating a gas turbine centre in the vicinity of the group nominal full-load conditions, the cooling of the working fluid before and/or during the compression is set in such a way that the respectively attainable full-load power is above the current power. Rapid power demands can therefore be rapidly satisfied by an increase in the turbine inlet temperature or by opening an adjustable inlet guide vane row, whereas the control of the cooling effect, which has a tendency to be more sluggish, is employed to adjust the full-load operating point.

21 Claims, 3 Drawing Sheets

METHOD OF OPERATING A GAS TURBINE GROUP

CROSS-REFERENCE TO RELATED APPLICATIONS

This application is a continuation of the U.S. National Stage designation of co-pending International Patent Application PCT/EP2004/050086 filed Feb. 5, 2004, which claims priority to Swiss patent application no. 2003 0207/03 filed Feb. 11, 2003, and the entire contents of these applications are expressly incorporated herein by reference thereto.

FIELD OF THE INVENTION

The present invention relates to a method of operating a gas turbine group.

BACKGROUND OF THE INVENTION

From U.S. Pat. No. 5,353,585, a method has become known in which atomized water is introduced into the induced air flow before the compressor of a gas turbine group. Due to evaporation cooling, the density of the induced air is increased and, with it, the mass flow of the working fluid and the maximum attainable power of the gas turbine group.

In U.S. Pat. No. 6,216,443, injecting water is proposed in such a way that liquid droplets enter the compressor. The droplets evaporate within the compressor, during the compression process, and this leads to intensive internal cooling of the compressor. In addition to the effect of increasing the mass flow, the evaporation cooling before the compressor also decreases the power taken by the compressor and the compressor exit temperature is reduced so that it is possible to increase the amount of fuel burnt in a subsequent combustion chamber. Overall, this results in an increase in the attainable maximum power of the gas turbine group, which maximum power is, of course, mainly limited by the mass flow of the working fluid and the permissible turbine inlet temperature.

From U.S. Pat. No. 6,012,279, furthermore, it is known to inject liquid between two partial compressors. This likewise effects a cooling of the working fluid, on the one hand between the compression steps in the first and second partial compressors and, on the other hand, also during the second compression step.

In the specialist world, the fluid injection in a compressor is currently referred by different concepts, such as "high fogging", "overfogging", "wet compression" and "overspray cooling". It should be mentioned that the positive effect has, in any case, been known per se for a long time, as is indicated for example by FR 1,563,749. The evaporation of a liquid in the working fluid during the compression offers a quite good approximation to an isothermal compression for comparatively small requirements in terms of apparatus.

In order to cool the working fluid, it is also known to use heat exchangers as intercoolers or, indeed, to use refrigeration machines for cooling the induced air.

Intercoolers in compressors are frequently operated at full cooling power over the whole of the operating range. Modern gas turbine groups operate far from the per se most favorable design point over wide load ranges.

U.S. Pat. No. 6,216,443 proposes that the liquid injection should only be put into operation when the gas turbine group, without water injection, is already being operated at full load and when the required power is still higher than the useful power which is actually delivered. This means that the gas turbine group itself is being operated with the maximum inlet volume flow of the compressor and the turbine entry temperature is at the maximum permissible value. The cooling of the working fluid, by the injection of liquid into the compressor, is used for a further increase in power. In the method proposed there, the necessary mass flow of the injection water is initially determined and injected as a function of the additional useful power which has to be provided. The gas turbine group therefore deviates from the full-load point and the fuel supply is successively increased until the gas turbine group is again operated at the full-load condition, which means with maximum permissible turbine inlet temperature and, if appropriate, completely opened inlet guide vane row.

In practice, however, it is found that there can be a duration of some 0.5 to 2 seconds before the water droplets have passed from the injection location to the compressor inlet. Likewise, the transit times of the components in the regulation and control mechanisms frequently used in gas turbine groups delay the detection of the temperature changes effected by the water injection and also, therefore, their effect on the fuel supply. In consequence, it is found that the water injection only becomes effective with a time lag. Similarly, it is impossible to realize an arbitrarily rapid switching on of the injected water quantity and an arbitrarily rapid increase of it. In addition, it is found that the dead periods and delay times, as described above, of a control line reduce the stability of a control circuit in such a way that the possible reaction speed is greatly reduced. Summarizing, therefore, the use of measures for cooling the working fluid during the compression and, in particular, the injection of water before the compressor, cannot be used to an unlimited extent for rapid increases in power.

SUMMARY OF THE INVENTION

The invention relates to providing a method of the type quoted at the beginning but which avoids the disadvantages of the prior art. In particular, the method is intended to permit very rapid, to practically lag-free, reaction to power demands on a gas turbine group where such demands are actually located above its basic full-load power. By the basic full-load power of the gas turbine group is meant, in this connection, the useful power which the gas turbine group is capable of producing under the prevailing ambient conditions—the ambient temperature and the ambient pressure, in particular, having a major influence—without the water injection or another variable, non-permanently operated cooling system.

In the case of power demands which are located close to the basic full-load power of the gas turbine group or beyond it, the core of the invention is to adjust the full-load power by cooling the working fluid before the compression, and/or during the compression and/or between two compression steps, in such a way that the gas turbine group is always operated below the full-load power. The full-load power is to be understood, in this connection, as the useful power which arises when a process parameter, such for example as the turbine inlet temperature—or, in the case of a gas turbine group with sequential combustion, all the turbine inlet temperatures—or when the compressor exit temperature or the compressor exit pressure reaches a maximum permissible value, the induction volume flow of the compressor being simultaneously at its maximum. In the case of a gas turbine group with adjustable inlet guide vane row, the induction volume flow is essentially determined by the setting of the inlet guide vane row; the maximum inlet volume flow is, in this case, equivalent to a fully open inlet guide vane row. It is self-evident that in the case of a gas turbine group with sequential combustion, such as is known from EP 620 362 or U.S. Pat. No. 5,454,220, the turbine inlet temperatures of all the turbines are located on the respectively permissible maximum value for the definition of the full-load operation. As stated at the beginning, the power delivered at the operating point defined in this manner increases if the cooling of the working fluid takes place before or during the compression process and specifically, on the one hand, by means of an increasing mass flow of the working fluid because of the cooling before the compressor, and because of the decreasing specific compressor power consumption in the case of cooling during the compression. In addition, the compressor exit temperature is lowered so that more heat can be supplied, by which means the full-load power is increased. In particular, both effects are utilized by means of the evaporative cooling when a liquid mist is sprayed into the working fluid before the compressor inlet, so that liquid droplets penetrate into the compressor. Because, in this way, the full-load power is set in each case in such a way that the gas turbine group is operated below the full-load power, a power reserve which can be rapidly activated is made available. This makes it possible to react, practically without delay, to rapid power demands in a simple manner, because the gas turbine group is itself always so operated by the adjustment of the full-load power that it has power reserves, which can be mobilized directly by increasing the heat supply to the compressed working fluid, i.e. by increasing the fuel supply—, in the case of a gas turbine group operating on the open-cycle process—to a combustion chamber. This means that in the case of rapid changes in the power demands, such as typically occur in the case of over-frequency or under-frequency, it is not necessary to differentiate between the operation with and without cooling.

In other words, it can also be stated that the cooling of the induced air or intercooling of the air is not used in order primarily to adjust the power of the gas turbine group to a required value which is located above the basic full-load power, or in order to change the useful power output but, rather, in order that the cooling, in accordance with the invention, is used in order to adjust the full-load point, i.e. to actually refer the gas turbine process to a different reference system.

To cool the working fluid, in a preferred method variant of the method according to the invention, a liquid, in particular water, is injected upstream of the compressor inlet. Due to evaporation, this effects a cooling of the mass flow of the working fluid before compression. If liquid penetrates into the compressor—perhaps because the injection location is very close to the compressor inlet or because the injection quantity is so large that the working fluid is supersaturated at the compressor inlet—the penetrating liquid continues to effect cooling during the compression. The liquid quantity introduced is, in this case, a measure of the cooling effect.

In one embodiment of the invention, the full-load power is determined by a reference full-load power, which is specified, for example, for ISO ambient conditions, i.e. 15° C. air temperature, 1013 hPa and 60% relative air humidity, being converted with corresponding correction terms, which take account of deviations of the ambient pressure, temperature and humidity from the standard conditions. Such conversions are familiar to the specialist, and manufacturers of gas turbines specify the corresponding correction terms for their different types of machines. In addition, the cooling effect is taken into account during the calculation. Here again, the determination of corresponding correction formulae specific to the machines is familiar to the specialist.

In one embodiment of the invention, the cooling effect is set in such a way that the turbine inlet temperature is located by a certain value below the maximum permissible turbine entry temperature. The cooling effect is therefore controlled to a required value of the turbine entry temperature, which value is located below the maximum permissible turbine entry temperature.

A further embodiment of the invention is preferably used when the gas turbine group has at least one adjustable inlet guide vane row and the operating concept of the gas turbine group envisages so controlling the setting of the inlet guide vane row that the turbine entry temperature remains at the maximum value even below the full-load power. The cooling effect can then be controlled in such a way that a certain inlet guide vane row setting is present as the target value. A control of the cooling effect takes place to a required value of the inlet guide vane row setting at which the inlet volume flow of the compressor is less than the maximum which is possible with a fully opened inlet guide vane row.

In a further embodiment, an actual relative power is determined from the actual useful power of the gas turbine group and the full-load power determined as described above. The cooling effect is set in such a way, and the full-load power therefore altered in such a way, that the relative power actual value is controlled to a required value at constant actual useful power. The cooling effect is therefore controlled to a full-load performance for which the actual useful power is located by a certain percentage below the full-load power. The relative power actual value is controlled by adjusting the full-load power to a relative power required value which is below 100%, in particular in the range between 90% and 95%. In a further variant of the method, the full-load power is set, by means of the cooling, to a certain absolute value, for example 10 MW, greater than the useful power required value.

It is particularly advantageous to define, around the required value, a dead band within which no interventions are undertaken on the cooling effect. One process would, for example, be conceivable in which the relative power required value is 90%, with a dead band of ±5%. A control intervention then only takes place if the actual relative power falls to under 85% or climbs to over 95%. This fundamentally ensures a power reserve, which can be rapidly mobilized, of at least 5% of the full-load power. The wide dead band ensures that the control system does not react in an oversensitive manner, and that the number of control interventions remains limited to a minimum, which is certainly in the interest of a stable operation. The operational process can, of course, also provide for the relative power to be generally kept within a certain target range. If the operating concept of the gas turbine group provides for the turbine inlet temperature or the turbine inlet temperatures to be kept to a certain value, for example the permissible maximum value, by control of an adjustable inlet guide vane row—and, if appropriate, also further adjustable compressor guide vane rows—it is possible to employ, as a further criterion for a control intervention, that the inlet guide vane row should be located in the fully closed position and the turbine inlet temperature should fall to below the maximum permissible value. With this assumption, it is sensible to undertake a control intervention even if the power is still located within the dead band, and to reduce the cooling effect. In this way, the fuel burn-out can be kept high and the emission of carbon monoxide and unburnt hydrocarbons can be kept low.

In one embodiment of the method according to the invention, the power is initially changed at an essentially constant cooling effect in the case of a change to the required useful power, which change can take place very rapidly. The relative power, and the reserve power maintained relative to the full-load power, then of course also change. In the case of a deviation from the respective target value specified in accordance with the statements made above or in the case of a departure from a target range, for example in the case of deviations from a specified relative power target value or when the gap between the actual power and full-load power falls below a minimum, the control of the cooling effect becomes active. If, for example, the relative power deviates upward from the target value and is located outside a permissible range, the water quantity injected before the compressor is, for example, increased. Because the cooling effect is increased in this way, the full-load power increases; in consequence, the actual relative power falls for constant useful power, and the operating point of the gas turbine group can again be controlled to the required relative power. The procedures often do not run in a time sequence but, rather, the control of the cooling effect has already begun to occur while the useful power is still being adjusted and controlled to a required value. The change to the full-load power then takes place simultaneously, but with a smaller gradient, in such a way that the value initially increases, for example, as a relative power employed as the command parameter, and is only subsequently controlled to be steady-state at a required value. According to the invention, the procedure described is, of course, employed in a manner analogous to a deviation from other specified required values, such as turbine entry temperature, inlet guide vane row setting, and so on. An analogous consideration also applies, of course, in the case of a reduction of the required useful power; in this case, the cooling effect is reduced in order to restore the required operating condition. The change to the full-load power can then take place substantially more slowly than the change to the actual power because, of course, the latter always has, during operation according to the method according to the invention and at the initial full-load power, access to both lower power and higher power. The actual power can then be changed rapidly enough to satisfy transient power demands, such as occur in the case of over-frequency and under-frequency. The variable cooling effect is used in order to reproduce the initial operating condition. This can take place relatively slowly; as an example, the actual power is changed in the second range, the required power in the minute range. By this means, allowance is made for the relatively delayed reaction described above and the reaction times of the control line.

Summarizing, it should be again stated that the core of the invention consists in operating a gas turbine group with variable cooling of the induced or partially compressed working fluid; preferably by the injection of a liquid, in particular water, before the compressor, in the compressor, or between two compressor steps, and, in the process, to set the cooling effect in such a way that although the operating condition, for a respective actual power output of the gas turbine group is close to the full-load operating point of the gas turbine group in each case, which for example ensures favorable emission values and a good efficiency, it is always also set below the full-load power, by which means a power reserve is made available which can be more rapidly mobilized than it could if it had to be first made available by means of the variable cooling. In this case, control of different operating parameters of the gas turbine group, which characterize the operating point of the gas turbine group relative to the full-load operating point, can be used as the command parameter for the control system. As suitable command parameters should be particularly mentioned the relative power, which is defined in each case as the current useful power referred to the current full-load useful power which depends on the cooling effect, also a power reserve from the useful power to the respective full-load power, a turbine entry temperature, or a setting of an adjustable compressor guide vane row, in particular an adjustable inlet guide vane row. The cooling effect is then controlled in each case in such a way that the command parameter is set to a required value or within a target range. In the case of control to a target value, a dead band is advantageously defined around the required value, within which dead band the control unit is deactivated in order to prevent an oversensitive intervention of the control unit in the case of the smallest deviations.

Further advantageous embodiments of the invention are obvious to the specialist in the light of the exemplary embodiments described below.

BRIEF DESCRIPTION OF THE DRAWINGS

The invention is explained in more detail below using exemplary embodiments illustrated in the drawing. In detail.

Elements not immediately necessary for understanding the invention are omitted. The exemplary embodiments should be understood as being purely instructive and should not be employed to limit the invention.

DETAILED DESCRIPTION OF THE PREFERRED EMBODIMENTS

Figure 1:
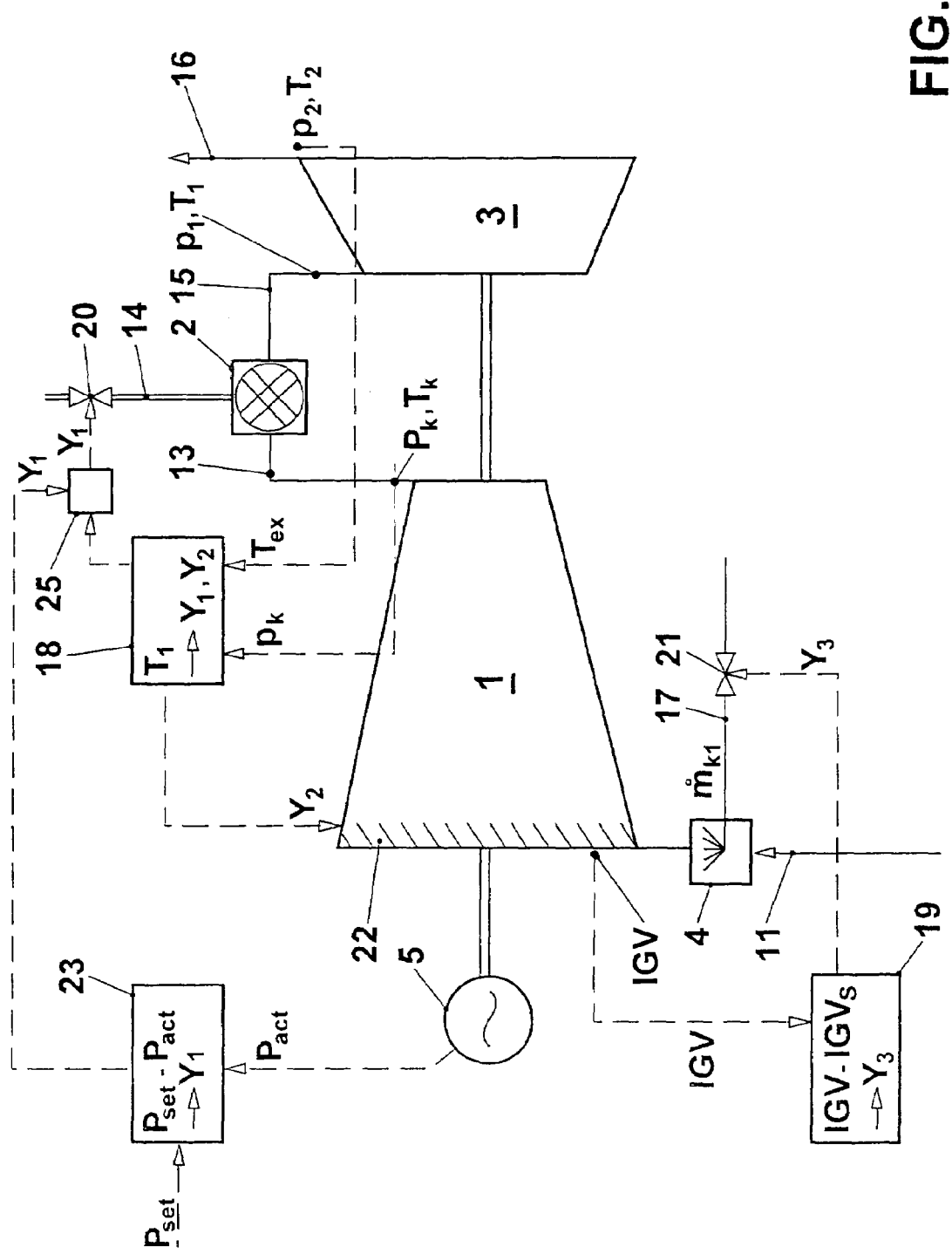
FIG. 1 shows a first example of a gas turbine group operated according to the invention.

In the gas turbine group represented in FIG. 1, a flow of working fluid, an induced air flow 11 in the present case, is compressed in a compressor 1 to a pressure $p_k$ and, in the process, is heated to the temperature $T_k$. The compressed air 13 flows into the combustion chamber 2. A fuel quantity 14, which is metered by a fuel quantity setting unit, is mixed with the compressed air 13 and is there burnt in the air. The unexpanded hot combustion gas 15 flows with the pressure $p_1$ and the turbine entry temperature $T_1$ into the turbine 3. The pressure $p_1$ corresponds, essentially, to the compressor exit pressure $p_k$, reduced by the combustion chamber pressure loss. The unexpanded combustion gas 15 is expanded in the turbine 3 to a pressure $p_{ex}$. This corresponds, essentially, to the ambient pressure. During the expansion, work is performed in the turbine. The exhaust gas 16 flows away with a temperature $T_{ex}$ and can, in a manner known per se, be used in a waste-heat steam generator, for example. The turbine 3 drives the compressor 1 and a generator 5, which are arranged on a shaft. The generator 5 generates a useful electric power $P_{ACT}$. This is compared with a required power value $P_{SET}$ in a control unit 23 and a setting parameter $Y_1$ for the fuel setting unit 20 is formed, from the control deviation, in such a way that the fuel quantity is increased or reduced as a function of the control deviation of the power. In general, the turbine entry temperature is not measured directly but is, for example, calculated as a function of the turbine outlet temperature and the compressor end pressure, in a manner familiar to the specialist. In the example, this takes place in a control unit 18, which limits the turbine entry temperature $T_1$ to a maximum value. When the turbine entry temperature has reached a permissible maximum value, the control unit 18 intervenes, by means of the setting parameter $Y_2$, in the IGV setting of an adjustable inlet guide vane row 22, which essentially determines the air flow volume induced by the compressor 1. When the permissible turbine entry temperature has been reached, the control unit 18 opens the adjustable inlet guide vane row 22 further. This increases the induction volume flow and consequently, for constant density of the induced air, the mass flow. For a constant turbine entry temperature, therefore, more fuel 14 can be burnt and the useful power increases. When the inlet guide vane row has been opened completely, the control unit 18 limits the fuel quantity. The inlet guide vane row is then open to its maximum extent and the turbine entry temperature is at its maximum; this is the full-load operating point of the gas turbine group and the power delivered in this operation is designated, in this context, as the basic full-load power. A liquid 17 can, in addition, be injected into the induced airflow 11 in an injection device 4. Due to the evaporation of the liquid before the compressor, the mass flow of the working fluid increases for a constant induction volume flow. If droplets penetrate into the compressor 1, these evaporate during the compression; this reduces the power taken by the compressor 1 and lessens the compressor exit temperature $T_K$. Because of the increased mass flow and the lowered compressor exit temperature, it is now possible to burn more fuel at constant turbine inlet temperature. In combination with the reduced power taken by the compressor, the power available for driving the compressor increases significantly. The full-load power therefore increases significantly as compared with the basic full-load power. Conversely, the actual relative power, as the ratio of the actual useful power to the full-load power, becomes smaller for constant actual useful power $P_{ACT}$. This means that for substantially constant, or even slightly falling fuel quantity, the turbine inlet temperature initially falls. In accordance with the control concept described above, the control unit 18 then comes into action and closes the inlet guide vane row 22 somewhat, so that the turbine inlet temperature is kept to the maximum value. The gas turbine group reacts comparatively sluggishly to the injection of the liquid before the compressor. Rapid changes of power, such as are necessary for dealing with over-frequencies or under-frequencies, can only be realized to a limited extent by changes to the cooling effect. Variable cooling by means of heat exchangers, for example as compressor intercooling, tends to react more sluggishly than the interventions in the injected liquid quantity. According to the invention, therefore, the gas turbine group is not, in fact, operated under full-load conditions, at least as long as the cooling of the working fluid before or in the compressor still has reserves, but—at a specified useful power which, for example, is greater than the basic full-load power—the cooling is operated in such a way that the current full-load power with cooling is greater than the actual useful power. In consequence, there is a reserve for further increasing the actual power more rapidly. In the example represented, sufficient water 17 is injected before the compressor so that the full-load power is greater than the actual useful power $P_{ACT}$ and the required useful power $P_{SET}$, in such a way that the control unit 18 does not operate at the limitation for the fuel quantity setting parameter. In the present example, the inlet guide vane row setting IGV is employed as the command parameter for the water quantity $m_k$. By means of a change to the injection water quantity, and therefore to the cooling effect, the setting IGV of the inlet guide vane row 22 is controlled to a required value $IGV_s$, at which the inlet guide vane row is not completely opened. From the required/actual value deviation of the inlet guide vane row setting, the control unit 19 forms a setting parameter $Y_3$ for the injection quantity $m_k$, which is set by means of the setting unit 21. Other operating parameters can, of course, be used as a command parameter, but the inlet guide vane row setting is particularly easily accessible and, in the relevant power range, there is a high correlation between the inlet guide vane row setting and the relative power.

Figure 2:
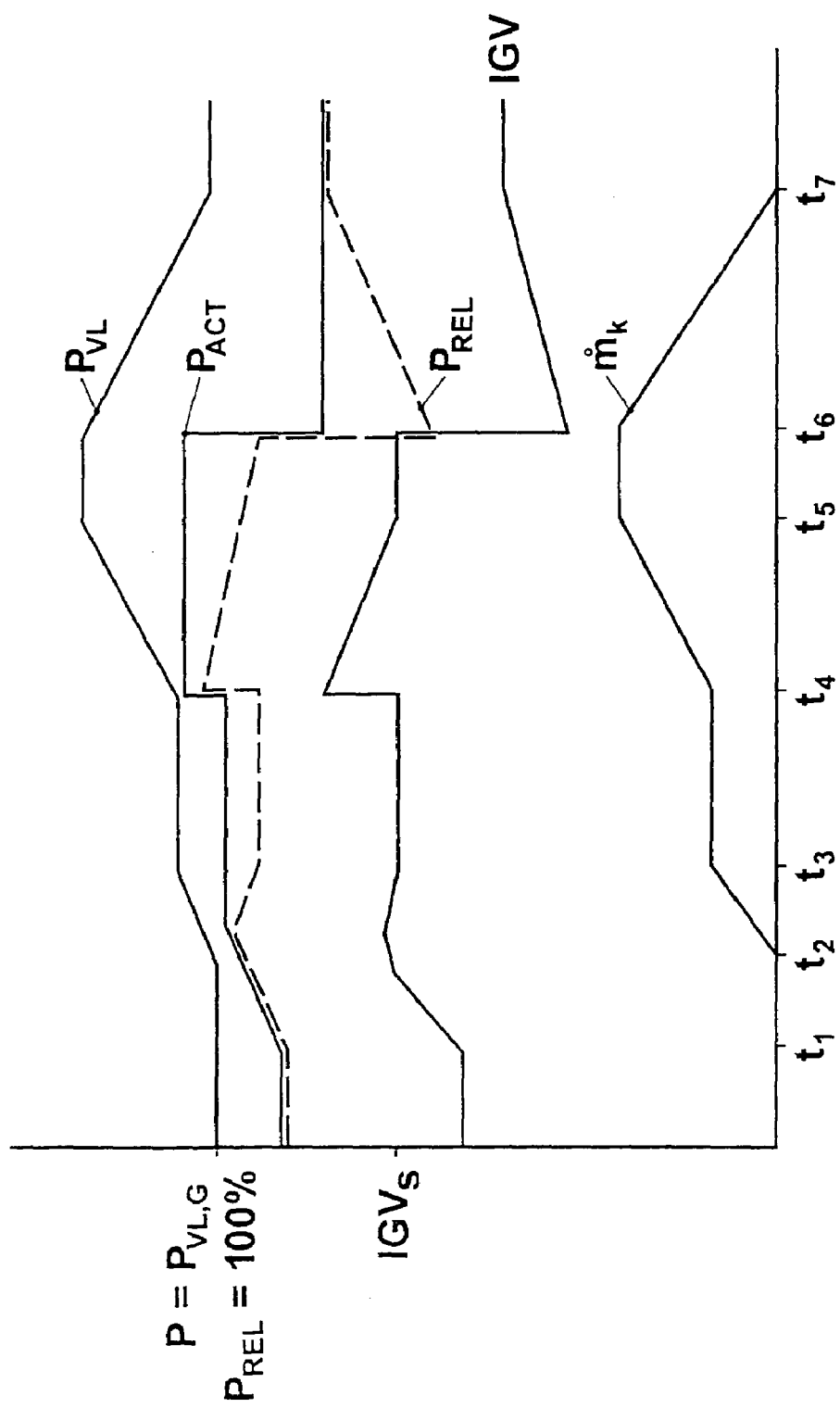
FIG. 2 shows an example of the variation of important operating parameters of the gas turbine group of FIG. 1 when the method according to the invention is used.

FIG. 2 represents, diagrammatically, exemplary variations of some parameters of the gas turbine group from FIG. 1. Represented are the variations of the full-load power $P_{VL}$, the actual power $P_{ACT}$, the actual relative power $P_{REL}$, the inlet guide vane row position IGV and the injected liquid quantity $m_k$, plotted against time. Designated on the vertical axis are the basic full-load power $P_{VL,G}$, 100% relative power, the required value of the command parameter for the cooling effect and the required inlet guide vane row setting $IGV_s$. At the start, the actual power is well below the full-load power. The position of the inlet guide vane row is still below the required value, the inlet guide vane row is still substantially closed and the water mass flow $m_k$ is still zero; in consequence, the control circuit for the cooling effect, i.e. the injected water mass flow, is still inactive. The full-load power $P_{VL}$ is equal to the basic full-load power $P_{VL,G}$. For an increase in the actual power, the inlet guide vane row is opened; the injection mass flow initially remains zero and the full-load power remains correspondingly constant. If the opening of the inlet guide vane row exceeds the required value, the control system for the water injection becomes active and the water mass flow $m_k$ increases. As described above, this affects the turbine inlet temperature and the inlet guide vane row opens with further increasing power with a comparatively smaller gradient. If the actual power remains constant, the water mass flow is further increased until the inlet guide vane row setting is controlled to the required value. Due to the cooling of the air upstream of the compressor and in the compressor, the full-load power of the gas turbine group increases with increasing water mass flow. The relative power initially increases correspondingly, in step with the actual power, increases more slowly on activation of the water injection and then falls. Although the actual power is almost equal to the basic full-load power, the relative power is clearly under 100% after stabilization of the injection quantity. Because of the cooling due to the injected water, the full-load power is set above the actual power. The difference is available as a power reserve which can be rapidly mobilized. Because of a rapid power demand at the time $t_4$, which is initiated for example by an under-frequency, the actual power is rapidly increased to almost the full-load power. The relative power increases correspondingly, and practically abruptly, to almost 100%. The inlet guide vane row has to be opened almost completely so that the turbine inlet temperature does not increase to above the maximum permissible value. The control unit 19 represented in FIG. 1 then increases the water quantity with a specified gradient. At constant actual power, the full-load power increases and the relative power falls. The inlet guide vane row is closed again. When the position of the inlet guide vane row has again reached the required value, the injection quantity is again kept constant and the gas turbine group again operates at the required operating point with a power reserve. If, at the time $t_6$, the power falls abruptly, the inlet guide vane row is also closed rapidly; the relative power falls with the actual power value. The control unit 19 reacts correspondingly with a reduction of the water mass flow. The full-load power falls, the relative power increases and the inlet guide vane row is opened again. The water quantity is reduced until either the required actual value deviation of the inlet guide vane row setting is decontrolled again or until the water injection is completely deactivated, and the control unit 19 therefore operates again at a boundary. In accordance with the control concept for the gas turbine group presented above, the turbine inlet temperature remains constant within the relative power range represented, because the turbine entry temperature is kept constant by the control unit 18 in cooperation with the inlet guide vane row setting.

It is, in any case, a particularly preferred embodiment of the invention to only activate the variable cooling, realized according to the exemplary embodiment by the injection of water, in the case of a highest possible turbine inlet temperature. In the case of a gas turbine group in which the turbine inlet temperature can be controlled by means of adjustable guide vane rows, the cooling is advantageously only activated when the turbine inlet temperature, in the appropriate case all the turbine inlet temperatures, has reached the maximum, full-load value. Conversely, the cooling effect is reduced when the turbine inlet temperature falls below the full-load value. This mode of operation ensures that the gas turbine group is always operated as close as possible to its design point and, in particular, the burn-out of the fuel is good, by which means low emissions of unburnt hydrocarbons and carbon monoxide are ensured.

Figure 3:
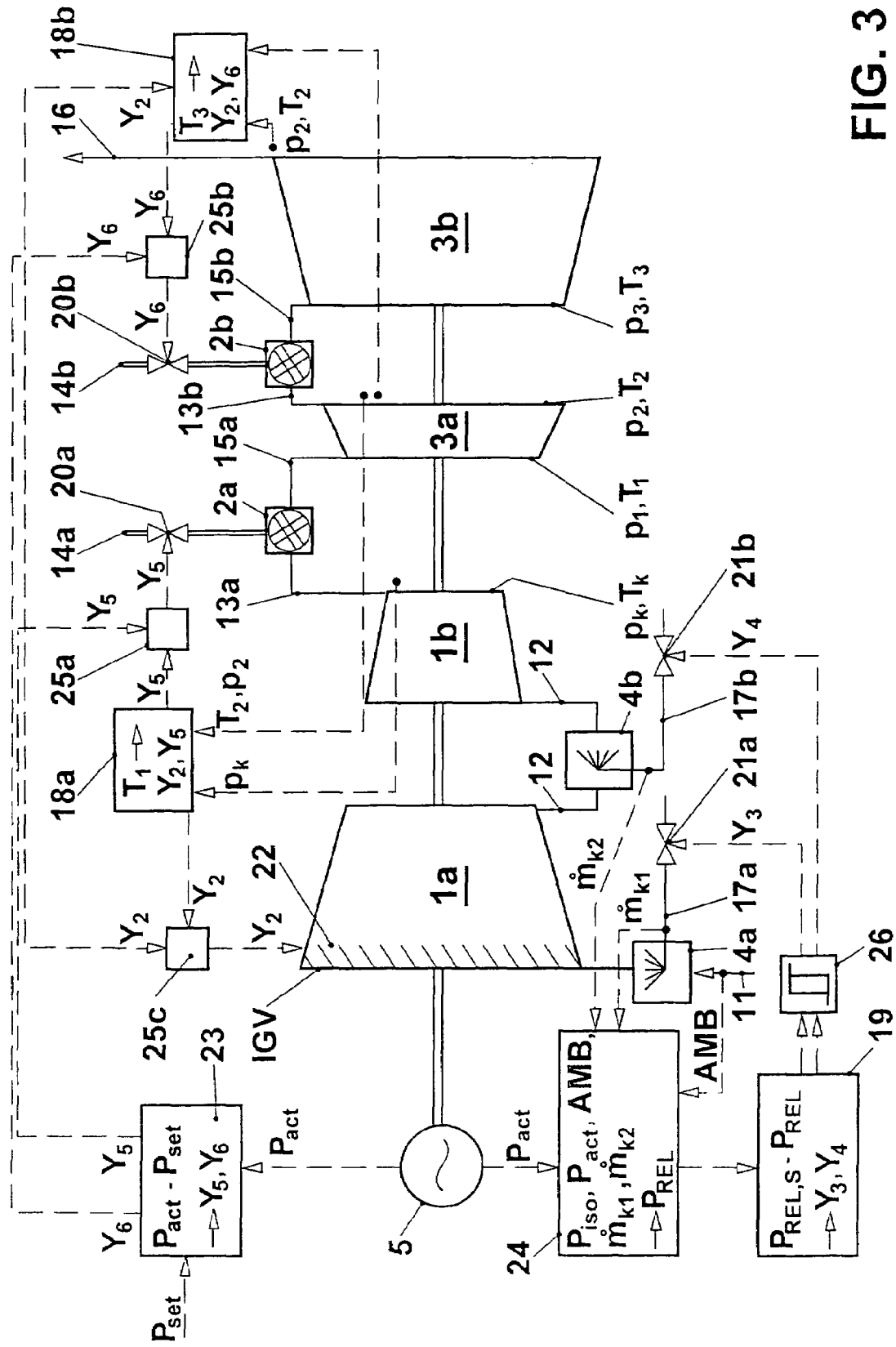
FIG. 3 shows a further gas turbine group operated according to the invention.

FIG. 3 shows an example of the realization of the invention on a sequentially fired gas turbine group of the type known from EP 620 362. Essentially, its function is obvious in the light of the preceding statements with respect to FIG. 1, for which reason a detailed description is dispensed with at this point. The special feature of the gas turbine group represented in FIG. 3 is that the working fluid has heat supplied to it again at least once between two expansion steps. In the gas turbine group represented, a quantity of fuel 14a is initially burnt in the compressed air 13a in a high-pressure combustion chamber 2a. The hot combustion gas 15a is partially expanded in a high-pressure turbine 3a, for example with a pressure ratio of 2. The partially expanded hot gas flows, with a residual oxygen content of some 15% to 17%, into a low-pressure combustion chamber 2b. The low-pressure combustion chamber is, in particular, a self-igniting combustion chamber of the type known from EP 669 500. A second quantity of fuel 14b is supplied and burnt there, and the still unexpanded working fluid is reheated and finally expanded in a low-pressure turbine 3b to approximately ambient pressure. In addition, the compressor is subdivided into two serially arranged partial compressors 1a and 1b, between which an injection cooler 4b, by means of which a liquid can be sprayed into the partially compressed working fluid 12, is arranged. Due to the evaporation of the liquid, a temperature reduction occurs in the partially compressed working fluid 12; in addition, liquid droplets penetrate into the high-pressure compressor 1b and cool the working fluid during the second compression. The variable supply of liquid to the injection appliances 4a and 4b is used, in accordance with the invention, in order always to control the full-load power to above the actual power, as is explained below. As is explained in connection with FIG. 1, a control unit 23 forms, from a control deviation $P_{SET}$-$P_{ACT}$ of the power, a fuel quantity setting parameter, which is subdivided—in accordance with criteria described elsewhere and not primarily essential in this connection—into setting parameters $Y_5$ and $Y_6$ for the two fuel quantity setting units 20a and 20b of the two combustion chambers. In addition, the respective turbine inlet temperature is calculated from the pressure ratios over a turbine and the temperature after the turbine, this because the turbine inlet temperature is, in practice, only accessible with difficulty for technical measurement reasons. In this connection, it is assumed that the pressure drop over the combustion chambers is essentially constant, in such a way that the turbine inlet temperature $T_1$ of the high-pressure turbine 3a is determined in the control unit 18a from the compressor exit pressure $p_k$, together with the pressure and the temperature after the high-pressure turbine, $p_2$ and $T_2$; in an analogous manner, which is comprehensively described elsewhere, the turbine inlet temperature $T_3$ of the low-pressure turbine is determined in the control unit 18b. In the two control units, setting parameters $Y_2$ for the setting element of the adjustable inlet guide vane row 22 are determined on the basis of the turbine inlet temperatures which have been determined. The two setting parameter determined in this way are compared with one another in a logic element 25c, and the greater one of the two, in particular, is relayed to the setting element. In addition, limiting criteria for the fuel quantity setting parameters $Y_5$ and $Y_6$ are determined from the turbine inlet temperatures, which setting parameters $Y_5$ and $Y_6$ are applied when the respective inlet temperature is at a maximum and the inlet guide vane row is already fully opened. These are compared with the fuel quantity setting parameters in the logic elements 25a and 25b, and, if required, limit the setting parameter further relayed to the respective setting element. In a computational circuit 24, the current basic full-load power $P_{VL,G}$ is calculated from the basic full-load power under standard ambient conditions for the gas turbine group, $P_{ISO}$, and the ambient conditions AMB, which means in particular temperature, pressure and humidity of the ambient air. This is further corrected for the cooling effect, the injection mass flows $m_{k,1}$ and $m_{k,2}$, being used as a measure of the cooling effect. The result of this operation is the current full-load power $P_{VL}$. These conversions are immediately obvious to the specialist using the fluid mechanics and thermodynamic relationships and being familiar with the special characteristics of the components of the gas turbine group. Finally, the actual useful power $P_{ACT}$ and the current full-load power $P_{VL}$, from which the relative power $P_{REL}$ is produced, are compared. In the control unit 19, finally, the setting parameters $Y_3$ and $Y_4$ for the liquid mass flow setting units 21a and 21b are determined from the control deviation of the actual relative power $P_{REL}$ and the required relative power $P_{REL,S}$, which setting units 21a and 21b control the mass flow of the water supplied to the injection appliance 4a, 4b. In this arrangement, the setting parameters are fed via a hysteresis element 26, which defines a dead band around the relative power required value, within which dead band the control interventions are suppressed, which avoids an oversensitive reaction of the water quantity control. If, therefore, the relative power is greater than the relative power required value, the injection mass flow $m_{k,1}$ and/or $m_{k,2}$ of at least one of the injection appliances is raised. In consequence, the current full-load power $P_{VL}$ rises and, for constant actual useful power, the actual relative power falls and, therefore, approaches the required value of the relative power. Conversely, the injection mass flow is reduced when the actual relative power is below the required relative power, this in order to control the actual relative power to the required value. In this way, the relative power is controlled, in steady-state operation, to a value within a dead band, around a relative power required value, of preferably in the range of 90% to 95%, in such a way that the rapidly mobilizable power reserve is always available. For the reasons quoted above, it is advantageous for the cooling effect to be reduced, although the relative power is still located within the dead band, if a turbine inlet temperature falls below the maximum value. As can be clearly recognized, the control to a relative power required value, as described here, is more complex than the control to a required value of the inlet guide vane row position presented in connection with FIG. 1, but it permits, particularly in connection with sequentially fired gas turbine groups, a better defined power reserve. The control procedure is presented in a manner analogous to the example represented in FIG. 2.

From the previous description and the exemplary embodiments described as above, the specialist obtains a detailed insight into the invention and the embodiments of the invention.

| LIST OF DESIGNATIONS | |
|---|---|
| 1 | Compressor |
| 1a | First partial compressor, low-pressure compressor |
| 1b | Second partial compressor, high-pressure compressor |
| 2 | Combustion chamber |
| 2a | First combustion chamber, high-pressure combustion chamber |
| 2b | Second combustion chamber, low-pressure combustion chamber |
| 3 | Turbine |
| 3a | First turbine, high-pressure turbine |
| 3b | Second turbine, low-pressure turbine |
| 4, 4a, 4b | Cooling appliance, injection appliance |
| 5 | Generator |
| 11 | Uncompressed working fluid, induced air |
| 12 | Partially compressed working fluid |
| 13, 13a | Compressed working fluid |
| 13b | Partially expanded combustion gas |
| 14, 14a, 14b | Fuel |
| 15, 15a, 15b | Heated combustion gas |
| 16 | Expanded working fluid, exhaust gas |
| 17, 17a, 17b | Coolant |
| 18, 18a, 18b | Temperature control unit |
| 19 | Control unit |
| 20, 20a, 20b | Fuel quantity setting element |
| 21, 21a, 21b | Coolant setting element |
| 22 | Adjustable inlet guide vane row |
| 23 | Power control unit |
| 24 | Computational element |
| 25, 25a, 25b, 25c | Logic element |
| 26 | Hysteresis element |
| AMB | Ambient conditions (pressure, temperature, humidity) |
| IGV | Position of the adjustable inlet guide vane row |
| $IGV_s$ | Required position of the adjustable inlet guide vane row |
| $m_k$, $m_{k,1}$, $m_{k,2}$ | Liquid mass flow for cooling |
| $P_{ACT}$ | Actual useful power |
| $P_{SET}$ | Required useful power |
| $P_{REL}$ | Actual relative power |
| $P_{REL,S}$ | Required relative power |
| $P_{ISO}$ | Full-load power under standard conditions |
| $P_{VL,G}$ | Basic full-load power |
| $P_{VL}$ | Current full-load power, actual full-load power |
| $p_k$ | Compressor exit pressure |
| $p_1$ | Pressure before first turbine |
| $p_2$ | Pressure after first turbine |
| $p_3$ | Pressure before second turbine |
| $p_{ex}$ | Pressure after last turbine |
| $T_K$ | Compressor exit temperature |
| $T_1$ | Temperature before first turbine |
| $T_2$ | Temperature after first turbine |

| -continued | |
|---|---|
| LIST OF DESIGNATIONS | |
| $T_3$ | Temperature before second turbine |
| $T_{ex}$ | Temperature after last turbine |
| $Y_1$ | Fuel quantity setting parameter |
| $Y_2$ | Inlet guide vane row setting parameter |
| $Y_3$ | Cooling effect setting parameter |
| $Y_4$ | Cooling effect setting parameter |
| $Y_5$ | Fuel quantity setting parameter for high-pressure combustion chamber |
| $Y_6$ | Fuel quantity setting parameter for low-pressure combustion chamber |

What is claimed is:

1. A method of operating a gas turbine group comprising:
compressing a working fluid in at least one compressor;
heating the compressed working fluid to a turbine inlet temperature in at least one component for the supply of heat by supplying a quantity of heat;
expanding the working fluid in at least one turbine;
generating a shaft power during expansion of the working fluid;
using at least a first part of the shaft power for driving the compressor; and
using a second part of the shaft power as useful power for driving a power consumption unit;
wherein full-load power of the gas turbine group is adjustable, with a cooling effect, by at least one selected from the group consisting of cooling the working fluid before compression, cooling the working fluid during compression, and cooling the working fluid between two compression steps;
wherein actual useful power of the gas turbine group is controlled to a required useful power; and
wherein the cooling effect is set such that current full-load power is larger than the actual useful power, and the gas turbine group is operated with an actual relative power of less than 100% relative to the current full-load power.

2. The method of claim 1, wherein the full-load power is defined as the useful power for which at least one selected from the group consisting of a process temperature and a process pressure is at a permissible maximum value at maximum inlet volume flow of the compressor.

3. The method of claim 2, wherein the inlet volume flow is determined by setting a compressor inlet guide vane row.

4. The method of claim 1, wherein the full-load power is defined as the useful power at which all turbine inlet temperatures have reached a maximum permissible limiting value at maximum inlet volume flow of the compressor.

5. The method of claim 4, wherein the inlet volume flow is determined by setting a compressor inlet guide vane row.

6. The method of claim 1, wherein the compressor induces ambient air, and the full-load power is calculated from at least one selected from the group consisting of a reference power, pressure of ambient air, pressure of induced air, temperature of ambient air, temperature of induced air, humidity of ambient air, humidity of induced air, and the cooling effect.

7. The method of claim 1, wherein the cooling effect is controlled by a control system such that an operating parameter suitable for describing the operating point of the gas turbine group relative to a full-load operating point is controlled to a target value, wherein the operating parameter is used as a command parameter for the control system.

8. The method of claim 7, wherein the command parameter is kept, in steady-state operation, within a dead band around the target value by varying the cooling effect.

9. The method of claim 7, wherein the relative power is used as the command parameter for the control system.

10. The method of claim 7, wherein a distance between the actual useful power and the current full-load power is used as the command parameter for the control system.

11. The method of claim 7, wherein the position of an adjustable inlet guide vane row is used as the command parameter.

12. The method of claim 7, wherein a turbine inlet temperature is used as the command parameter for the control system.

13. The method of claim 7, wherein in the event of a change to required useful power, the actual useful power is changed with a first power gradient, with the command parameter deviating from the target value, and the full-load power is altered with a second power gradient by an adjustment of the cooling effect so that the command parameter is again controlled to the target value, the second power gradient being smaller than the first power gradient.

14. The method of claim 1, wherein the cooling effect is controlled by a control system such that an operating parameter suitable for describing the operating point of the gas turbine group relative to a full-load operating point is controlled to within a target range, wherein the operating parameter is used as a command parameter for the control system.

15. The method of claim 14, wherein the relative power is used as the command parameter for the control system.

16. The method of claim 14, wherein a distance between the actual useful power and the current full-load power is used as the command parameter for the control system.

17. The method of claim 14, wherein the position of an adjustable inlet guide vane row is used as the command parameter.

18. The method of claim 14, wherein a turbine inlet temperature is used as the command parameter for the control system.

19. The method of claim 14, wherein in the event of a change to required useful power, the actual useful power is changed with a first power gradient, with the command parameter deviating from the target range, and the full-load power is altered with a second power gradient by an adjustment of the cooling effect so that the command parameter is again controlled to the target range, the second power gradient being smaller than the first power gradient.

20. The method of claim 1, wherein the cooling effect is set by changing a mass flow of liquid introduced into the working fluid in at least one location selected from the group consisting of before the compressor, in the compressor, and between two compressor stages.

21. The method of claim 20, wherein a mass flow of liquid introduced at an injection appliance is used as a measure of the cooling effect.

* * * * *